United States Patent [19]

Harrington et al.

[11] Patent Number: 5,737,455
[45] Date of Patent: Apr. 7, 1998

[54] ANTIALIASING WITH GREY MASKING TECHNIQUES

[75] Inventors: Steven J. Harrington, Holley; R. Victor Klassen, Webster, both of N.Y.

[73] Assignee: Xerox Corporation, Stamford, Conn.

[21] Appl. No.: 353,763

[22] Filed: Dec. 12, 1994

[51] Int. Cl.$^6$ .............................. G06K 9/36; H04N 1/40; H04N 1/36
[52] U.S. Cl. .................. 382/284; 382/266; 382/268; 358/448; 358/455; 358/461; 358/464; 358/534
[58] Field of Search .............................. 358/296, 448, 358/455, 451, 461, 462, 464, 456, 534, 535, 536, 537, 538; 395/102, 109, 128, 162, 101, 141, 126, 131, 132, 133, 135; 382/284, 268, 269, 266, 283; 345/43, 44, 113, 114, 136, 137

[56] References Cited

U.S. PATENT DOCUMENTS

| | | | |
|---|---|---|---|
| 4,907,282 | 3/1990 | Daly et al. | 382/284 |
| 4,908,780 | 3/1990 | Priem et al. | 364/521 |
| 5,164,717 | 11/1992 | Wells et al. | 358/455 |
| 5,172,423 | 12/1992 | France | 382/284 |
| 5,270,688 | 12/1993 | Dawson et al. | 345/150 |
| 5,333,249 | 7/1994 | Klassen | 395/143 |
| 5,351,067 | 9/1994 | Lumelsky et al. | 345/191 |

FOREIGN PATENT DOCUMENTS

WO 9114995  10/1991  WIPO.

OTHER PUBLICATIONS

Foley et al., Computer Graphics Principles and Practice, pp. 72–91 (1990).

F. Crow, "The Aliasing Problem in Computer–Generated Shaded Images", Comm. ACM, vol. 20, No. 11, Nov. 1977, pp. 799–805.

A. Schilling, "A New Simple and Efficient Antialiasing With Subpixel Masks", Computer Graphics, vol. 25, No. 4, Jul. 1991, pp. 133–141.

Porter et al., "Compositing Digital Images", SIGGRRAPH '84, Computer Graphics, vol. 18, No. 3, Jul. 1984, pp. 253–259.

Knuth, "Sorting and Searching," The Art of Computer Programming, vol. 3, pp. 145–149, Addison Wesley Pub. Co. Reading, 1973.

*Primary Examiner*—Edward Coles, Sr.
*Assistant Examiner*—Mark Wallerson
*Attorney, Agent, or Firm*—Mark Costello

[57] ABSTRACT

A method of combining antialiased edges for printing or display at a grey level reproduction device, wherein pixels have shade values determined as a function of their neighbor's shade values and mask values. Shade values are determined by processing each pixel in terms of subpixels forming the pixel. Each of a plurality of subpixels are assigned mask and shade values as a function of their position in the pixel and with respect to the nearest neighbors. The resulting values for each subpixel are averaged to determine a final output value for the pixel.

23 Claims, 5 Drawing Sheets

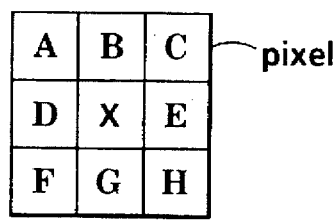
FIG. 4
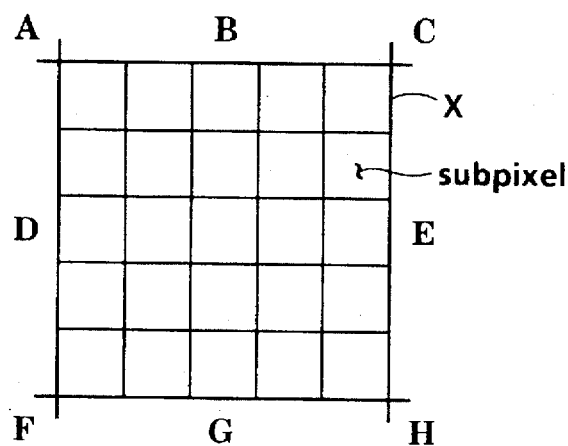
FIG. 5
| A | $\frac{A+B}{2}$ | B | $\frac{B+C}{2}$ | C |
|---|---|---|---|---|
| $\frac{A+D}{2}$ | $\frac{A+B+D+X}{4}$ | $\frac{B+X}{2}$ | $\frac{B+C+E+X}{4}$ | $\frac{C+E}{2}$ |
| D | $\frac{D+X}{2}$ | X | $\frac{E+X}{2}$ | E |
| $\frac{D+F}{2}$ | $\frac{D+F+G+X}{4}$ | $\frac{G+X}{2}$ | $\frac{F+G+H+X}{4}$ | $\frac{F+H}{2}$ |
| F | $\frac{F+G}{2}$ | G | $\frac{G+H}{2}$ | H |
FIG. 6

ANTIALIASING WITH GREY MASKING TECHNIQUES

This invention relates to a method of combining background and foreground images, and more particularly to method of antialiasing edges in the combined images, utilizing grey masking techniques.

BACKGROUND OF THE INVENTION

Some printers and displays are capable of reproducing multiple levels of grey, as compared to the common printers that print only black or non-black. Such grey level printers include those using dye diffusion, direct electrostatic printing, certain grey printing ink jet devices, and the hyperacuity printers described, for example, in U.S. application Ser. No. 08/145,009, titled "Interlace Formatting in a Hyperacuity Printer". Additionally, printers that take in continuous tone input, even if those printers then halftone the input, are considered continuous tone, particularly if the halftoning occurs at a resolution higher than the image input resolution. Such printers operate to directly reproduce continuous tone images, as compared, for example, to binary printers that operate to print black and white, and require halftoned input to produce images that appear grey when viewed at normal distances. Grey printers may also be capable of reproducing continuous tone polychromatic images, when provided with the appropriate marking materials, and arrangements that allow the superposition of different marking material separations. Here, we refer to grey printers as the class of printers that print more than about 2 levels of grey, and preferably in the range from 16 to 256 levels of grey.

The process of constructing a raster image takes as input a series of input primitives (such as characters, polygons, and scanned images) which are drawn sequentially onto an existing background image (which conceptually, at least, may be considered to be an array of pixels or image signals, each of which contains the current background color). The background image begins blank, and when all of the input primitives in the series have been drawn, it contains the desired raster image. The raster image may then be displayed or transmitted to a raster output printer. The input primitives each have associated with them a color and a shape. One way of describing the primitives is to consider the shape to be a mask or stencil, and the color as an ink which is put through the mask. The mask is commonly represented digitally, with a zero value representing opaque (impermeable) and a one value representing transparent (permeable). As an input primitive (the foreground image) is combined with the background image, for each pixel in which the mask value is 1, the corresponding pixel in the background image has its value replaced with that of the ink (the foreground color).

In almost any digital printing method, the shapes of graphical objects and text are dictated by binary masks. Each pixel forming an object is either a part of the object, or it is not. Thus, representations of edges that are not exactly aligned with fast scan or slow scan processing directions of a printing device are characterized by sharp, jagged or sawtoothed edges (aliased edges) reflecting the attempt to approximate the edge on pixel boundaries, as illustrated in FIG. 1. See, for example Foley et al, Computer Graphics Principles and Practice, pp. 72–91 (1990), which discusses how such lines are created. One desirable aspect of this construction is that it enables edges to butt together when two objects are placed side-by-side, enabling the formation of complex images. However, when exposed, aliased edges are often deemed unattractive, and detracting from image quality. Aliasing, therefore, refers to the introduction of low frequency components of the (sampled) image that would not be present in an ideal (not sampled) image, but which occur in the actual image as an artifact of the sampling rate. Frequencies above half the sampling rate in the ideal image appear 'aliased' as frequencies below the sampling rate.

One approach to resolving this problem is to increase resolution so that the jagged edges become finer and are better integrated by the eye. However, increasing resolution is costly in any reproduction device.

Another well known process in the graphics arts community for alleviating the aliasing problems on CRT displays is referred to as "antialiasing". Antialiasing techniques attempt to remove higher frequencies appearing in the image or to limit them to cases that are likely to match the ideal image. This process entails the placement of grey pixels at edges of objects to soften the transition between foreground and background, as illustrated in FIG. 2. Typically each edge pixel is given a grey value that is a weighted average of the foreground and background levels, with the weights depending on the location that the edge of the idealized object passes through it. See, for example, "The Aliasing Problem in Computer-Generated Shaded Images", Comm. ACM, Vol. 20, No. 11, Nov. 1977, by F. Crow, pp. 799–805; "A New Simple and Efficient Antialiasing with Subpixel Masks", Computer Graphics, Vol. 25, No. 4, July 1991, by A. Schilling; also, WO91/14995 A1 to Wells et al., entitled "Method and Apparatus for Rendering Anti-Aliased Polygons". Also note U.S. Pat. No. 5,333,249 to Klassen, entitled, "Method for Phase Aligned Nth Bitting for Graphics Applications".

Applying antialiasing to the ink/mask model, the mask is no longer binary: values between 0 and 1 are used along the edges to represent partial coverage of a pixel by the mask. Typically, as a new primitive is drawn into the background image, a weighted average of the ink with the background value is used as the new background value. Specifically, the value of the mask is multiplied by the ink value, while one minus the value of the mask is multiplied by the background value, and the two are summed to give the new background value. For example, in the interior of an object, the mask value is 1, and so the ink color is used on its own, while in the exterior, the value is 0, so the background remains unchanged. For a pixel on the edge, if the mask half covers the pixel, the pixel and background will be equally weighted. This approach is known in the art as alpha-blending, (alpha is the opacity or mask value). See, for example, WO91/14995 A1 to Wells et al., and "Compositing Digital Images", Porter et al., SIGGRRAPH '84, Computer Graphics, Vol. 18, No. 3, July 1984, pp. 253–259.

Unfortunately, antialiasing in this manner introduces image errors when one antialiased object is placed on top of, or beside another (see FIG. 3, which illustrates one possible defect). The problem is that the grey pixel really represents a blend or combination of background and foreground areas, and the antialiased foreground pixel represents a partial overlap of the pixel by the object. Alpha blending only works correctly on average, and in certain common cases it leaves a visible boundary where none should exist. Accordingly, to render the region properly, the shapes of these regions must be known, so that the algorithm can decide how much background region is covered by the foreground object. If the shapes of the regions that the grey values represent are known, the resulting average shade of the pixel may be determined. However, this information is not available. The single blending process used in antialiasing treats the pixel as if both background and foreground regions are covered with a single (possibly partially transparent) object. Since this is untrue for the image of FIG. 3, where objects are placed side-by-side, an erroneous boundary is generated.

In addition to the described problem, presented in the case of two similar resolutions, further antialiasing problems are presented whenever foreground objects are combined with background images, where one or the other are found in different resolutions. In such cases, the prior art antialiasing solutions fail to meet user requirements.

References disclosed herein are incorporated by reference for their teachings.

SUMMARY OF THE INVENTION

The present invention is directed to a method of combining objects into an image.

In accordance with one aspect of the present invention, there is provided an improved method for combining foreground objects with background images, using high resolution edge information derived from low resolution grey image representations. Given low resolution background and/or foreground information, high resolution edge information for either the object edge or the background edge is derived for a single pixel, approximated by reference to surrounding image areas. The high resolution edge information can be used to derive a new grey value for the pixel.

Several opportunities for image improvement are presented, when either the foreground object or the background image (or both) are represented as low resolution grey, for example: 1) a foreground object may be received as a high resolution binary image, with a system requirement to convert background to a conforming representation for combination with the foreground object. Such processing preserves more information than reformatting the foreground object to a grey representation and using alpha blending; 2) the foreground and background might be at different resolutions (although grey) with a system requirement to determine a common resolution (binary) for combination and reduction to the background resolution; and 3) the foreground and background may be received at the same low resolution and they must both be raised to high resolution for combination into the final output image.

In accordance with one aspect of the invention a method of combining continuous tone foreground and background images is provided, including the steps of: 1) providing a high resolution version of a pixel of interest, including a plurality of subpixels; 2) assigning a value to each subpixel as a function of its position in the pixel and the values of nearest neighbors of the pixel; 3) combining the assigned values for each subpixel in the pixel to determine a final output value for the pixel. At times, depending on the resolution of the originally received image, the function of step 2) may ignore surrounding pixels.

In accordance with another aspect of the invention, there is provided an improved method of combining continuous tone foreground and background images, where the foreground and background images are received at common resolutions. In such a case, pixels in a received image have shade values determined as a function of their neighbors' shade values and mask values. Shade values are determined by processing each pixel in both the background and foreground in terms of subpixels forming the pixel. Each of a plurality of subpixel areas is assigned mask and shade values as a function of its position in the pixel and with respect to the nearest neighbors. The resulting values for each subpixel are averaged to determine a final output value for the pixel.

In accordance with yet another aspect of the invention, there is provided an improved method of combining continuous tone foreground and background images, where the foreground and background images are received at different, relatively low resolutions. A final image should have background and foreground at a common resolution. In such a case, pixels in an image have shade values determined as a function of their neighbors' shade values and mask values. Accordingly each pixel of interest is divided into subpixels at a common, higher resolution. Shade values are determined by processing each pixel in both the background and foreground in terms of subpixels forming the pixel. Each of a plurality of subpixel areas is assigned mask and shade values as a function of its position in the pixel and with respect to the nearest neighbors. The resulting values for each subpixel are averaged to determine a final output value for the pixel, at a common, lower resolution.

In accordance with still another aspect of the invention, there is provided an improved method of combining binary or continuous tone foreground and background images, where one of the foreground and background images are received at relatively high resolution, while the other image is received at a relatively low resolution. In such a case, the high resolution image is binary or continuous tone, while the low resolution image is continuous tone. The low resolution image is scaled up to the same resolution as the given high resolution image for combination, with the result being stored at the resolution of the background image (which might be high or low).

In accordance with another aspect of the invention, there is provided a method of processing an image displayable or printable at a number of grey levels, and providing antialiasing for edges in such data, the method comprising: a) receiving mask values and shade values representing an image with an antialiased edge, for a pixel of interest and a plurality of neighboring pixels thereto in the image; b) subdividing the pixel of interest into a predetermined number of subpixels; c) determining from the mask data for the pixel of interest a number $p$ of subpixels that should be permeable; d) determining a permeability value for each subpixel as a function of the mask value of the pixel of interest, the mask value of at least one neighbor and the relative position of the subpixel in the pixel of interest and the at least one neighbor; e) sorting the determined permeability values by magnitude, and identifying subpixels having the $p$ largest magnitudes as permeable; f) determining for the pixel of interest and the plurality of neighboring pixels a minimum shade value and a maximum shade value; g) determining from the shade data for the pixel of interest a number $q$ of subpixels that should be background; h) determining a shade value for each subpixel as a function of the shade value of the pixel of interest, the shade value of at least one neighbor and the relative position of the subpixel in the pixel of interest and the at least one neighbor; i) sorting the determined shade values by magnitude, assigning the maximum shade value to subpixels having the $q$ largest shade values and assigning the minimum shade value to the remaining subpixels; j) for each subpixel identified as permeable, resetting the shade value of that subpixel equal to an object shade; k) averaging the shade values of all the subpixels to obtain the antialiased value of the pixel.

A more complete understanding of the present invention can be obtained by considering the following detailed description in conjunction with the accompanying drawings in which.

Figure 1:
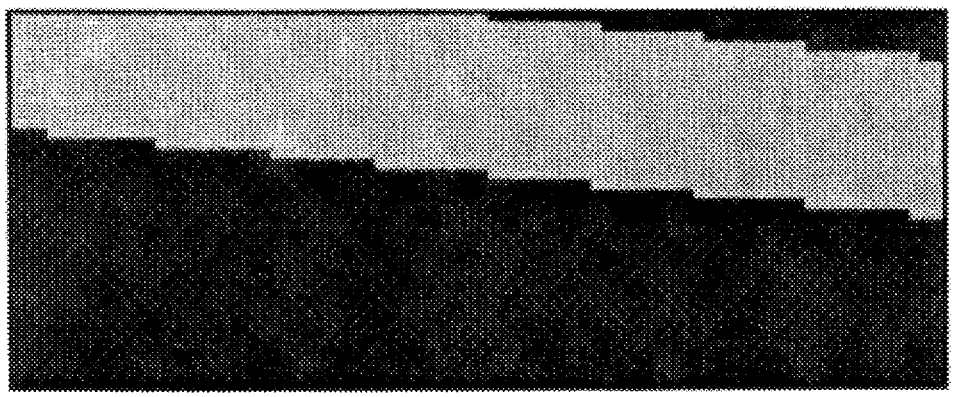
FIG. 1 illustrates the problem of aliasing or jaggies.
Figure 2:
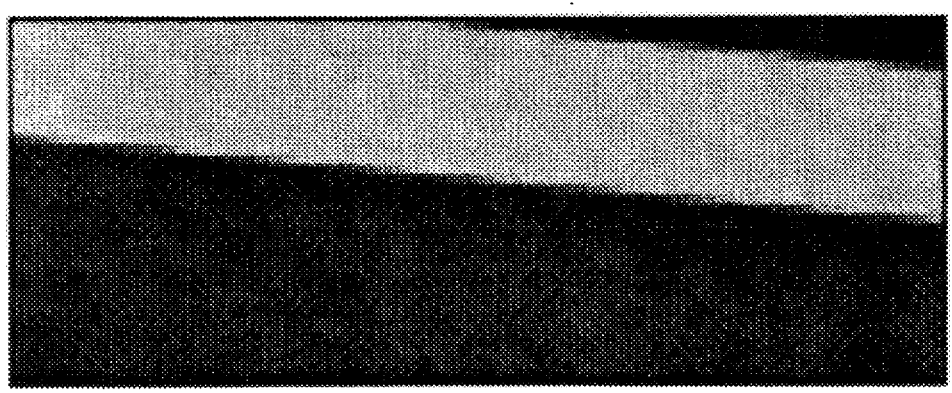
FIG. 2 illustrates antialiasing using grey pixels at object boundaries.
Figure 3:
FIG. 3 illustrates a defect noted when two antialiased objects are placed side by side.
Figure 7:
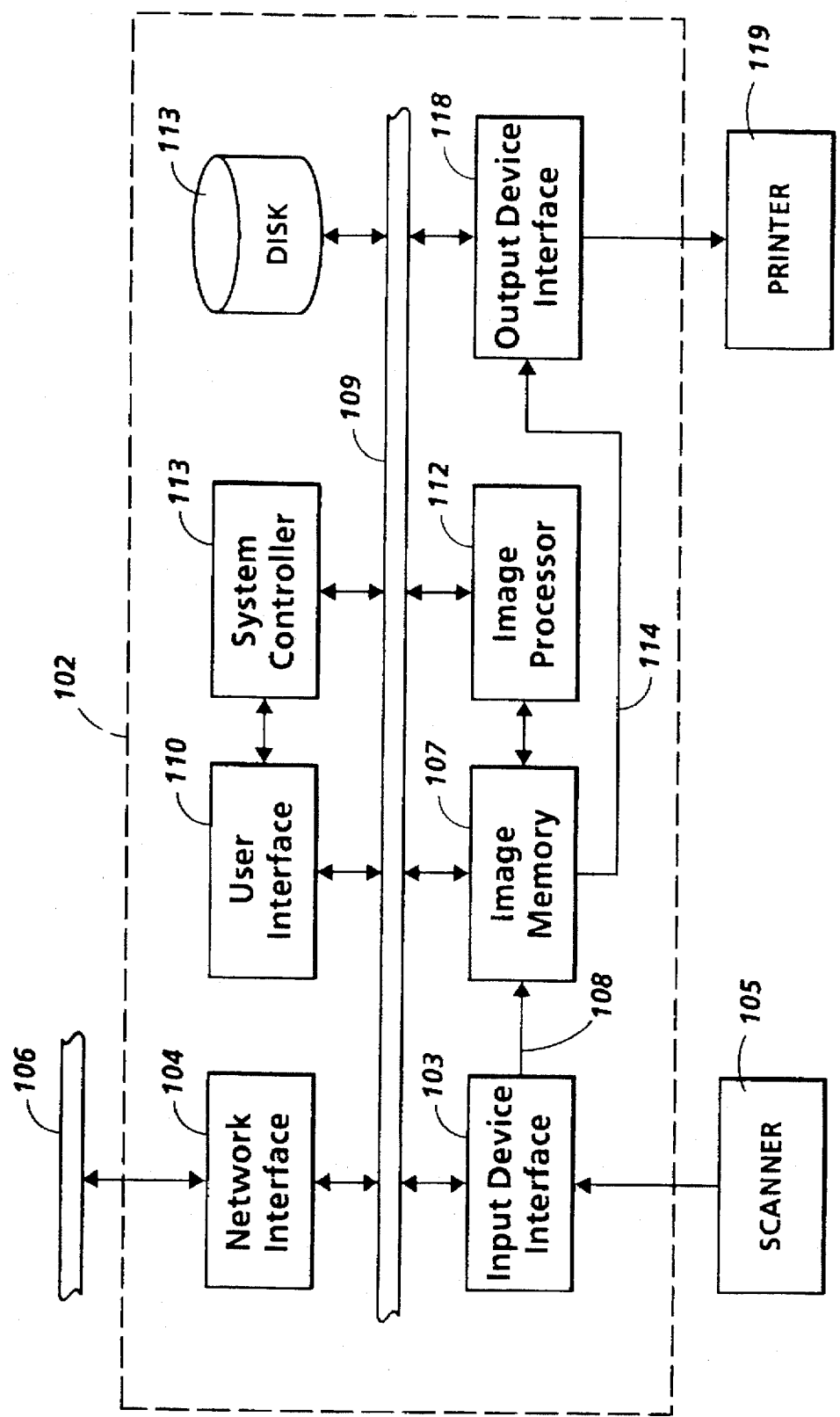
Figure 8:
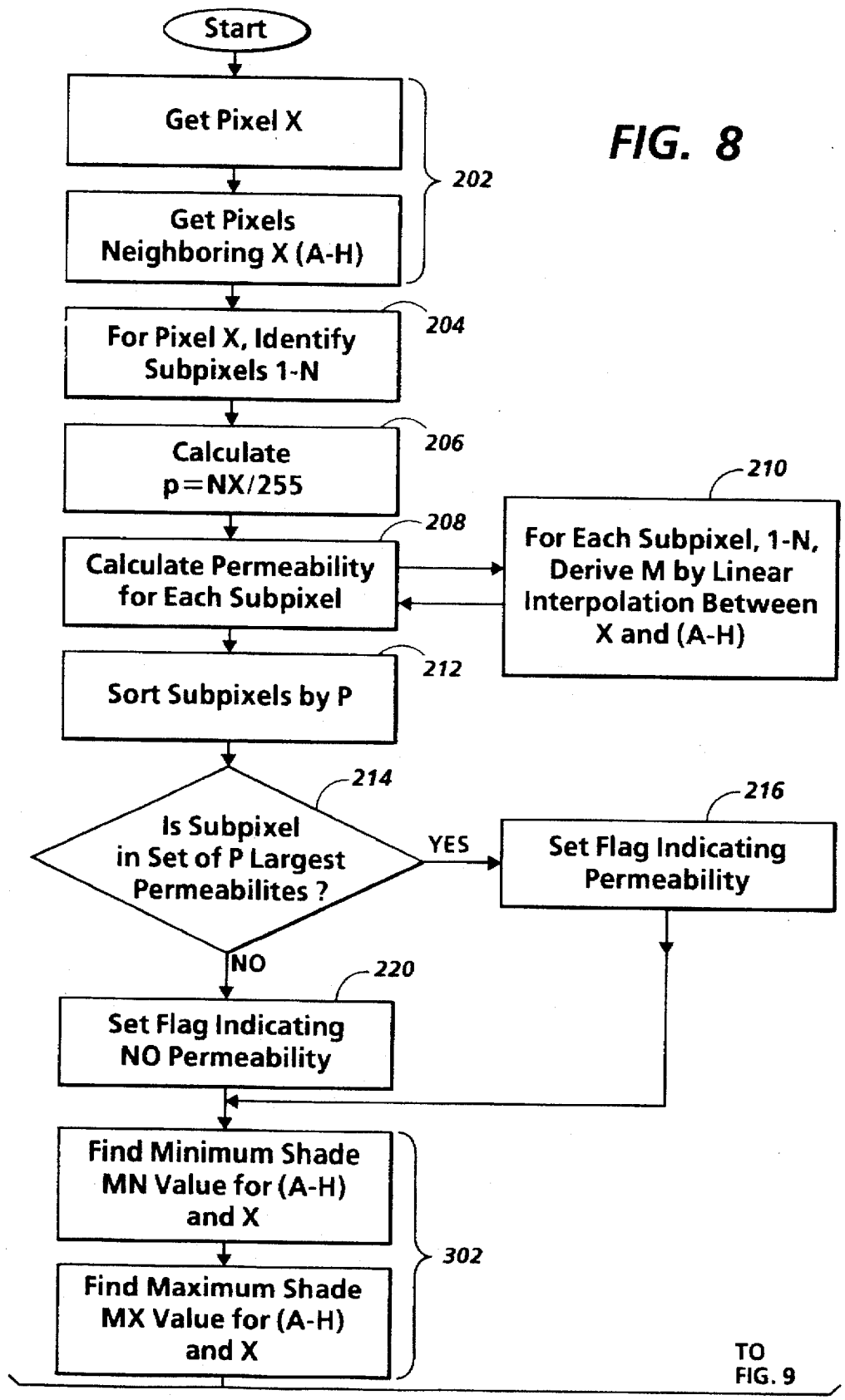
Figure 9:
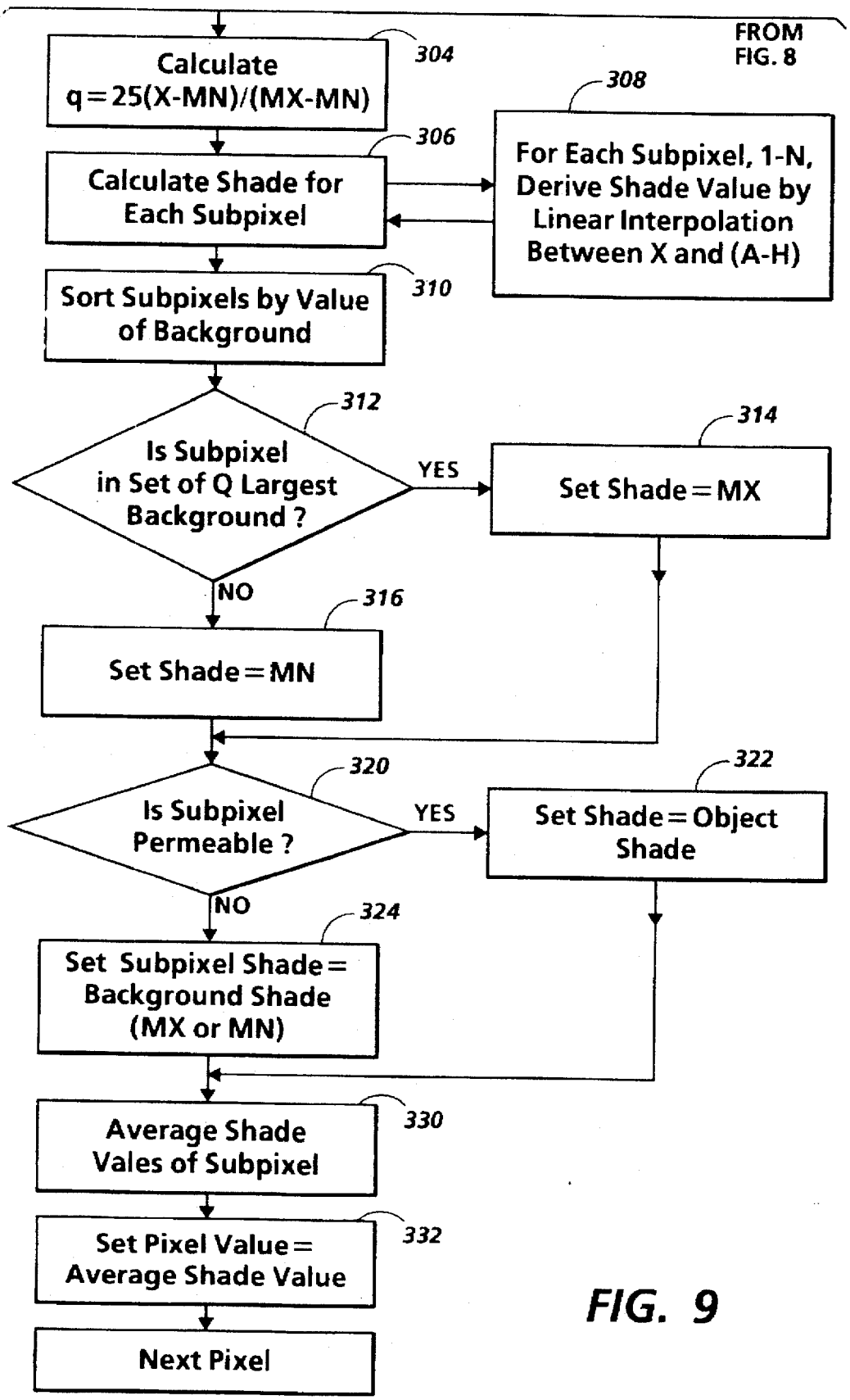

FIGS. 4, 5 and 6 together illustrate the principle of the invention, which uses surrounding pixel information to derive the mask value for each pixel;

FIG. 7 represents an exemplary system in which the present invention may find use; and FIGS. 8 and 9 illustrate a flow chart of the inventive process.

DESCRIPTION OF THE PREFERRED EMBODIMENT

With reference now to the drawings, where the showings are for the purpose of illustrating an embodiment of the invention and not for limiting same, FIGS. 4–7 illustrate the principle of the present invention. In accordance with the present invention, an estimate of the regions of the pixel covered by the new object and each of the background shades are combined to give a current value of each pixel. This is done by taking the current pixel and its eight immediate neighbors as a model for the behavior of the image within the pixel. FIG. 4 illustrates pixel X and its immediate neighbors A–H. While the present invention is described with references to immediate neighbors, extensions of the invention might use an increased or decreased number of neighbors. A "pixel" refers to an image signal associated with a particular position in an image, having a shade between white and black. Accordingly, pixels are defined by intensity (or density) and position. "Grey", as used herein does not refer to a color unless specifically identified as such. Rather, the term refers to image signals that vary between maximum and minimum, irrespective of the color of any separation in which the image signals are used. As used herein, images are ordered collections of image signals acquired by scanning an original document with a document scanner, an electronic camera or the like; or by a computer operated in accordance with a computer graphics generation program; or obtained from a memory without reference to the original source.

As used herein, "foreground" refers to the new object being added to an image during the construction of a final image. "Background" refers to the existing image's state at the point before a new foreground object is added. The background may include objects added to the image prior to the current object of interest. As the term will be used herein, "shade" refers to the color or intensity of objects such as the foreground object of interest, of objects in the background. As used herein, "mask" refers to a description of an object's shape. To describe an object one must indicate both its shape and its color (i.e., its mask and shade). One can think of the process of adding an object to an image as painting ink through a stencil onto a background image. The stencil provides the shape and acts as the mask. The ink provides the shade. The shape defining stencil has areas that are open and permit the ink to pass, and other areas where the flow of ink is blocked. In accordance with this analogy, regions where the foreground shade is permitted to replace the background are referred to as permeable. Areas where the background remains correspond to regions of the mask that are not permeable.

Image information received may be in a number of formats. In the class of images received via a PDL description, the images are described in resolution independent terms and accordingly can be decomposed into an image element of any arbitrary or useful resolution. Images may be received already prepared for rendering at a given printer, at the printer resolution. Image elements to be combined may also be received at multiple resolutions, requiring conversion as required to a common resolution.

Considering initially a PDL-described image, as it is initially decomposed into a bitmap, a foreground object will have a shade value i and mask value M at each pixel forming the object, in order to blend shade and background. A mask value represents how much of a pixel is covered by the object. It should be clear that in some locations in the image, no blending occurs, and the value of the pixel is either the object shade, or the background shade. At other locations however, the mask value represents the partial covering of the pixels by the object or the background. The problem is to estimate the shape of the object within the pixel boundaries from the mask value of the pixel and the mask values of the neighboring pixels. The shape of the object within the pixel is defined in terms of an increased or hyper-resolution grid of regions or subpixels within the pixel.

With reference now to FIG. 5, pixel X is divided into S subregions or subpixels. In one embodiment, shown in our example, S=25 has been selected as a convenient number of subpixels for calculation purposes, with smaller or larger numbers, greater than 1, not precluded. A smaller number of subpixels may not accurately characterize changes in the mask over the pixel area, while a larger number will increase processing time. The subpixels have also been illustrated for convenience as corresponding to equal sized regions. This is not necessarily the case.

It will be recognized that the foreground and/or the background may be received at different resolutions. If the foreground and background are relatively low, but different resolutions, the number of subpixels may be selected as a function of a common multiple of each received resolution. If one of the images received is a high resolution image, there will be no need to process the high resolution image in any particular manner. The background image is processed at resolution N. In the following example, we assume that foreground and background are at a common resolution.

To be determined are which subpixels should be permeable and which should be opaque. Under the assumption that a sharp edge is being represented by the mask, subpixels are either made totally opaque or totally permeable. The fraction of the subpixels that are permeable should match the value M of the mask of this pixel. Stated another way, in an 8 bit system, where the number of possible display or printing levels N is equal to 256 (including 0), if mask value M is given as $$0 \leq M \leq 255$$

and the number of subpixels is S then the number p of permeable subpixels would be given as $$p = MS/N = 25M/255$$

A fractional permeability parameter P of each subpixel is determined by interpolating mask values with neighboring pixels (for example using linear interpolation), which for the example pixel and its neighbors shown in FIGS. 4 and 5, are given in FIG. 6. Then, the p subpixels with the highest fractional permeability values P are selected. It will be appreciated that what is important is that that subpixel mask values be derived that reflect relative relationships of the mask values of pixel X and pixels neighboring pixel X.

There are many potential functions that describe such relationships and could be substituted for the linear interpolation function described and illustrated here.

Looking to the array of FIG. 6, the most permeable subpixels are available by the logical function of sorting. Sorting techniques are well known and many methods can be used; the heapsort technique (See, e.g., Knuth) is, however, particularly well suited because it computes each next largest value as needed. This means it minimizes the required computation when only a partial sorted list is required. In this case only the p largest values (or S-p smallest values) are needed, and sorting computation can cease once they have been identified. See, Knuth, "Sorting and Searching," The Art of Computer Programming, Vol. 3, pp. 145–149, Addison Wesley Pub. Co., 1973. The function heapsort can sort the subpixels and select those subpixels with the largest permeability values. One need not perform a full sorting of all subpixels, but at most half of them, since either p or S-p regions will do (at most 12 for the 5×5 case). If p is greater than half the subpixels one can use of the heapsort function to discover the (S-p) smaller valued regions, and then determine the complement to get the largest valued regions. This means that the sort can always be terminated less than halfway through the list of entries.

Analysis of background is similar to the analysis of the mask. A pixel is assumed to be a blend of two shades, so that one or the other of two shades is assigned to each of the subpixels, such that the average of all the regions match the overall pixel shade. The first step is to determine which of the two shades will be used. These are computed as the maximum and the minimum of the shade values for the pixel and its eight neighbors, so that $$MX=Max(X,A,B,C,D,E,F,G,H)$$

$$MN=Min(X,A,B,C,D,E,F,G,H)$$

The subpixel background values can be calculated for the background value of the pixel and its eight neighbors, according to the same formula used for the mask calculation, in FIG. 6. However, the number q of subpixels to select is calculated as $$q=S(X-MN)/(MX-MN)$$

If MX=MN, the background is a uniform shade, and the pixel merge can be done as a special case that will be described below.

The same sorting procedure as used in the mask permeability determination can also be used to determine the q largest background valued subpixels. If a subpixel is selected, it is assigned shade MX. The remaining subpixels are assigned shade MN.

Once permeability and a background shade for each of the subpixels have been determined, the next step is to determine the new shade for each subpixel. If the subpixel mask value has been determined to be permeable, then the shade is that of the foreground object. Otherwise, the subpixel is assigned the background subpixel value, either MX or MN.

The final step is to average the shade for all of the subpixels of the pixel. The resulting average value is the new shade value for the pixel.

The above analysis is rather complex to be carried out efficiently on a per pixel basis. Fortunately, the most common cases do not require this degree of processing. If the mask value is 0 (a minimum value in an 8 bit system indicating impermeability), then the pixel shade is set to the background value $X_b$, that is, the pixel value is unchanged. If the mask value is 255 (a maximum value in an 8 bit system indicating permeability) then the result is set to the foreground object shade i. If the background value is white or black (255 or 0) or if the maximum value matches the minimum value (MX=MN), then the background is considered uniform and the alpha blending formula, given as $$(X_M i+(N-X_M)Xb)/_N$$

can be used as the resulting pixel value.

Referring now to FIG. 7, a basic document processing system is shown including a document processing system 102. The image processing system 2 receives image information either through input device interface 103 or network interface 104. In this embodiment, input device interface 103 is connected to scanner 105 which generates images 10 I (x,y,d) having a defined width x, length y and number of density levels d. Common scanners, such, for example, the Pixelcraft 7650, produce 8 bit/pixel data, providing d=256, at resolutions acceptable for many purposes. Color images may be defined by a plurality of bitmaps. Alternatively, image information received through network interface 104 from network 106 can be transmitted from devices such as remote scanners, file servers or page description language (PDL) drivers (not shown). Information received through network interface 104 may contain in part or in full image information in the form of raster images having a defined width, length and depth.

Once a raster image is received from scanner 105 by document processing system 102, image I (x,y,d) is transmitted to image memory 107 either through connection 108 or data bus 109 as directed by system controller 111. In the event image information is simultaneously received through interfaces 103 and 104, controller 111 routes image information from network 6 to secondary storage or hard disk 13 through data bus 109 and image information from input device or scanner 105 to primary storage or image memory 107 using connection 108. Once image information such as image I (x,y,d) is received and stored in memory 107, image processor 12 is invoked by controller 11 as programmed through user interface 10 which operates on a video display or the like. Subsequent to processing image I (x,y,d) resulting in antialiased image information, the image stored in memory 107 is either reproduced on output device or printer 119 through connection 114 and output device interface 118 or transmitted to secondary storage 113 or a remote device connected to network 106 through data bus 109. It will be noted that the present invention applies primarily to the case of the combination of images, e.g., when shapes defined by a PDL file overprint a scanned image.

Now, the invention will be described in terms of a set of steps. With reference now to FIG. 8, initially, image signals representing shade values and mask values are obtained for a pixel of interest (X) in the foreground image and its adjacent neighbors A–H at step 202. At step 204, a set of S subpixels (in the described embodiment S=25 subpixels) corresponding to pixel X is identified. Based on the number of subpixels identified and the mask value of X, at step 206, a number p is derived, representing the number of subpixels that should be (totally) permeable in pixel X. At step 208, a fractional permeability value P for each subpixel is calculated, as a function of the position of the subpixel in the array of S values, the mask values for the neighboring pixels A–H, and the mask value of pixel X. Step 210 suggests that this function is preferably a linear interpolation process, which returns the values described at FIG. 6. Other functions that derive relative values of each subpixel based on surrounding pixels can be used.

At step 212, the subpixels are sorted by fractional permeability value P, so that at step 214, the subpixels with the largest fractional permeability values P can be identified. At step 216, if the subpixel is in the set of subpixels having the largest fractional permeability values P, then a flag is set for the subpixel indicating that it is "permeable". Otherwise the flag indicates that the subpixel is not permeable (step 220).

With reference now to FIG. 9, initially, at step 302, a minimum shade value MN and a maximum shade value MX are determined from the set of shade values received for pixels X and A–H of the background image. Knowing the values MN and MX and X, at step 304 a value q is derived, representing the number of subpixels that should have the maximum background shade. At step 306, a shade value for each subpixel is calculated, as a function of the position of the subpixel in the array of S values, the shade values for the neighboring pixels A–H, and the shade value of pixel X. Step 308 suggests that this function is preferably a linear interpolation process, that returns the values described at FIG. 6. Other functions that derive relative values of each subpixel based on surrounding pixels can be used.

At step 310 subpixels are sorted by the shade values determined, so that at step 312, the subpixels with the largest shade values can be identified. At step 314, if the subpixel is in the set of subpixels having the largest shade values, then the subpixel is set to value MX. Otherwise, the subpixel is set to value MN (step 316).

At this point, the foreground mask, along with the background shade are available at high resolution. If the foreground shade is not directly available at high resolution, it may be obtained by a scaling function, possibly as described for the background shade. (Typically it is constant within an object).

During the remainder of the process, the information about the subpixels, which is derived from what might be occurring at neighboring pixels, is used to determine shade and mask values for pixel X. At step 320, the flag for each subpixel is reviewed to see if it is permeable. At step 322, if the flag is set to indicate permeability, the subpixel shade is set to the object shade. Otherwise, at step 324, the subpixel is set to either of the background shades, depending on whether it was assigned value MN or MX. At step 330, the subpixel shade values are averaged together. At step 332, the pixel shade is set to the average shade value determined at step 330. The process then begins again for the next pixel.

The disclosed method may be readily implemented in software using object oriented software development environments that provide portable source code that can be used on a variety of computer or workstation hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The image processing system, however, can be readily developed by those skilled in the applicable arts without undue experimentation from the functional description provided herein together with a general knowledge of the compute r arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

We claim:

1. A method of combining continuous tone foreground and background images, said images comprised of pixels each assigned a mask value and a shade value, including:
   1) providing a background image including pixels having a shade value, and at least one foreground image including pixels having a mask value and a shade value, wherein said received background and foreground images are received at a common resolution;
   2) providing a high resolution version of a pixel of interest in the foreground image and the background image, including a plurality of subpixels;
   3) assigning a mask value and a shade value to each subpixel as a function of its position in the pixel of interest and the values of nearest neighbors of the pixel of interest;
   4) combining the assigned values for each subpixel in the pixel of interest to determine a final output value for the pixel of interest, whereby the combined image has an improved edge between the foreground and background images.

2. A method of combining continuous tone foreground and background images, said images comprised of pixels each assigned a mask value and a shade value, including:
   1) providing a background image including pixels having a shade value, and at least one foreground image including pixels having a mask value and a shade value, wherein said received background and foreground images are received at different resolutions;
   2) providing a high resolution version of a pixel of interest in the foreground image and the background image, including a plurality of subpixels, wherein said high resolution version of said pixel of interest is at a resolution selected to be a multiple of each of the different resolutions;
   3) assigning a mask value and a shade value to each subpixel as a function of its position in the pixel of interest and the values of nearest neighbors of the pixel of interest;
   4) combining the assigned values for each subpixel in the pixel of interest to determine a final output value for the pixel of interest, whereby the combined image has an improved edge between the foreground and background images.

3. The method as described in claim 2, wherein the multiple of each of the different resolutions is an integer value.

4. The method as described in claim 2, wherein one of said received background and foreground images is received at the high resolution, and the other is received at a substantially lower resolution, treating each high resolution received image pixels as a subpixel.

5. The method as described in claim 4, wherein,
   said function applied in said step of assigning a mask value and a shade value to each subpixel operates to set the subpixel value equal to the received pixel value for the high-resolution image.

6. A method of processing an image displayable or printable at a number of grey levels G greater than about 2, and providing antialiasing for edges in such an image, the method comprising:
   a) receiving mask and shade values for an antialiased image edge, for a pixel of interest and a plurality of neighbors thereto in an image;
   b) subdividing the pixel of interest into a predetermined number of subpixels;

c) determining from the mask value for the pixel of interest a number p of subpixels that should be permeable;

d) determining a fractional permeability value for each subpixel as a function of the mask value of the pixel of interest, the mask value of at least one neighbor and the relative position of the subpixel in the pixel of interest and the at least one neighbor;

e) sorting the determined fractional permeability values by magnitude, and identifying subpixels having the p largest magnitudes as permeable;

f) determining for the pixel of interest and the plurality of neighboring pixels a minimum background shade value and a maximum background shade value;

g) determining from the shade value of the pixel of interest a number q of subpixels that should be set to the maximum background shade value;

h) determining a shade value for each subpixel as a function of the shade value of the pixel of interest, the shade value of at least one neighbor and the relative position of the subpixel in the pixel of interest and the at least one neighbor;

i) sorting the determined shade values by magnitude, assigning the maximum shade value to subpixels having the q largest shade values and assigning the minimum shade value to the remaining subpixels;

j) for each subpixel identified as permeable, resetting the shade value of that subpixel equal to an object shade;

k) averaging the shade values of all the subpixels to obtain the antialiased value of the pixel.

7. The method as defined in claim 6, wherein for the plurality of neighbors includes 8 adjacent pixels.

8. The method as defined in claim 6, wherein the predetermined number of subpixels is about 25.

9. The method as defined in claim 8, wherein p is determined by the function:

$$p = SM/N$$

where M is the mask value of the pixel of interest, S is the number of subpixels and N is the value of a fully permeable pixel.

10. The method as defined in claim 8, wherein q is determined by the function:

$$q = S(X-MN)/(MX-MN)$$

where
MN is said determined minimum shade value,
MX is said determined maximum shade value
S is the number of subpixels; and
X is the shade value of the pixel of interest.

11. The method as described in claim 6, and including:
comparing the mask value of the pixel of interest with the minimum and maximum mask values for the system;
immediately setting the pixel shade value to a background shade value if the mask value is a minimum mask value; and
immediately setting the pixel shade value to the object image value if the mask value is a maximum value.

12. The method as described in claim 6, and including:
comparing the determined background value of the pixel of interest with the minimum and maximum shade values for the system;
setting each pixel determined to have the minimum or maximum shade value to a value given by $$(X_M i + (N - X_M) X b)/N.$$

where
$X_M$ is the mask value of pixel X
$X_b$ is the background value of pixel X
i is the shade value of pixel X
N is the maximum possible mask value.

13. The method as described in claim 6, and including:
comparing the maximum value to the minimum value for the neighborhood of the pixel of interest;
setting each pixel determined to have the maximum value match the minimum value (MX=MN) to a value given by:

$$(X_M i + (N - X_M) X b)/N.$$

where
$X_M$ is the mask value of pixel X
$X_b$ is the background value of pixel X
i is the shade value of pixel X
N is the maximum possible mask value.

14. A method of processing an image displayable or printable at a number of grey levels greater than about 2, and providing antialiasing for edges in such data, the method comprising:

a) for a foreground image defined in terms of pixels having mask values and shade values with an antialiased edge, to be combined with a background image defined in terms of pixels having shade values, receiving a pixel of interest and a plurality of neighboring pixels thereto in the image;

b) subdividing the pixel of interest into a predetermined number of subpixels;

c) determining, from the pixel of interest and a plurality of neighboring pixels thereto, which subpixels should be considered as permeable;

d) determining, from the pixel of interest and a plurality of neighboring pixels thereto, which subpixels should be considered to have the maximum shade values of said pixel of interest and said plurality of neighboring pixels thereto and which subpixels should have the minimum shade values of said pixel of interest and said plurality of neighboring pixels thereto;

e) setting any subpixels to the object shade if such pixels are determined permeable;

f) setting any subpixels that are not determined to be permeable to the determined one of the minimum or maximum shade values;

g) setting the pixel equal to the average shade value of all the subpixels.

15. The method as defined in claim 14, wherein the plurality of neighbors includes 8 adjacent pixels.

16. The method as defined in claim 14, wherein the predetermined number of subpixels is about 25.

17. The method as described in claim 14, and including:
comparing the mask value of the pixel of interest with the minimum and maximum mask values for the system;
immediately setting the pixel shade value to a background shade value if the mask value is a minimum mask value; and
immediately setting the pixel shade value to the foreground object shade value if the mask value is a maximum value.

18. The method as described in claim 14, and including:
comparing the determined background value of the pixel of interest with the minimum and maximum shade values for the system;

setting each pixel determined to have the minimum or maximum shade value to a value given by $$(X_M i+(N-X_M)Xb)/N.$$

where
- $X_M$ is the mask value of pixel X
- $X_b$ is the background value of pixel X
- i is the shade value of pixel X
- N is the maximum possible mask value.

19. The method as described in claim 14, and including:

comparing the maximum value to the minimum value for the neighborhood of the pixel of interest;

setting each pixel determined to have the maximum value match the minimum value (MX=MN) to a value given by:

$$(X_M i+(N-X_M)Xb)/N.$$

where
- $X_M$ is the mask value of pixel X
- $X_b$ is the background value of pixel X
- i is the shade value of pixel X
- N is the maximum possible mask value.

20. A method of antialiasing edges for printing or display of an image at a grey level reproduction device, comprising:

a) for a foreground image defined in terms of pixels having mask values and shade values with an antialiased edge, to be combined with a background image defined in terms of pixels having shade values, receiving a pixel of interest and a plurality of neighboring pixels thereto in the image;

b) subdividing the pixel of interest into a predetermined number of subpixels;

c) assigning a mask value and a shade value to each subpixel as a function of the subpixel position in the pixel and with respect to the neighboring pixels, and the respective mask and shade values thereof;

d) setting any subpixels to an object shade if subpixels have a mask value indicating permeability;

e) setting remaining subpixels to one of the minimum and maximum shade values of the neighboring pixels;

f) setting the pixel of interest equal to the average shade value of all the subpixels.

21. The method as described in claim 20, and including:

comparing the mask value of the pixel of interest with the minimum and maximum mask values for the system;

immediately setting the pixel shade value to a background shade value if the mask value is a minimum mask value; and immediately setting the pixel shade value to the object image value if the mask value is a maximum value.

22. The method as described in claim 20, and including:

comparing the determined background value of the pixel of interest with the minimum and maximum shade values for the system;

setting each pixel determined to have the minimum or maximum shade value to a value given by $$(X_M i+(N-X_M)Xb)/N.$$

where
- $X_M$ is the mask value of pixel X
- $X_b$ is the background value of pixel X
- i is the shade value of pixel X
- N is the maximum possible mask value.

23. The method as described in claim 20, and including:

comparing the maximum value to the minimum value for the neighborhood of the pixel of interest;

setting each pixel determined to have the maximum value match the minimum value (MX=MN) to a value given by:

$$(X_M i+(N-X_M)Xb)/N.$$

where
- $X_M$ is the mask value of pixel X
- $X_b$ is the background value of pixel X
- i is the shade value of pixel X
- N is the maximum possible mask value.

* * * * *